United States Patent

Nakanishi et al.

[11] Patent Number: 5,150,138
[45] Date of Patent: Sep. 22, 1992

[54] PROJECTION TYPE IMAGE DISPLAY APPARATUS

[75] Inventors: Hiroshi Nakanishi, Tenri; Hiroshi Hamada, Nara, both of Japan

[73] Assignee: Sharp Kabushiki Kaisha, Osaka, Japan

[21] Appl. No.: 657,752

[22] Filed: Feb. 21, 1991

[30] Foreign Application Priority Data

Feb. 26, 1990 [JP] Japan .................................. 2-45076

[51] Int. Cl.$^5$ .................................. G03B 21/14
[52] U.S. Cl. .................................. 353/38; 353/31; 353/122; 359/40; 359/49
[58] Field of Search ...................... 353/32, 38, 122, 31, 353/30, DIG. 3, 98; 362/309, 308; 359/53, 40, 48, 69, 619, 628

[56] References Cited

U.S. PATENT DOCUMENTS

| | | | |
|---|---|---|---|
| 3,267,802 | 8/1966 | Noble | 353/38 |
| 3,296,923 | 1/1967 | Miles | 353/38 |
| 3,582,204 | 6/1971 | Browning | 353/38 |
| 4,619,508 | 10/1986 | Shibuya et al. | 353/38 |
| 4,722,593 | 2/1988 | Shimazaki | 353/122 |
| 4,988,188 | 1/1991 | Ohta | 353/122 |

FOREIGN PATENT DOCUMENTS

| | | |
|---|---|---|
| 60-262131 | 12/1985 | Japan . |
| 61-11788 | 1/1986 | Japan . |
| 2-12224 | 1/1990 | Japan . |
| 2-89025 | 3/1990 | Japan . |
| 2-209093 | 8/1990 | Japan . |

*Primary Examiner*—William A. Cuchlinski, Jr.
*Assistant Examiner*—William C. Dowling
*Attorney, Agent, or Firm*—Nixon & Vanderhye

[57] ABSTRACT

A projection type image display apparatus which includes an arc lamp for emitting light rays by arc discharge, a reflecting mirror for reflecting the light from the arc lamp, the light rays being made parallel by an optical means such as a condenser lens, and projected into a transmissive display panel. The parallel rays are focused by the microlens array in the respective picture elements. The light rays through the transmissive display panel are projected onto a screen. The arc of the arc lamp is directed perpendicularly to the optical axis of an optical system so that the light rays are made parallel with the optical axis by the optical means.

8 Claims, 2 Drawing Sheets

PROJECTION TYPE IMAGE DISPLAY APPARATUS

BACKGROUND OF THE INVENTION

1. Field of the Invention

The present invention relates generally to a projection type image display apparatus, and more particularly to a projection type image display apparatus including a transmissive display panel such as a liquid crystal panel, having a plurality of picture elements arranged in a matrix. This type of display apparatus is particularly applicable to a large-screen projection TV (television), information display system, or the like.

2. Description of the Prior Art

In order to obtain parallel light rays, the projection type image display apparatus employs a parabolic reflecting mirror or an oval reflecting mirror. When a parabolic reflecting mirror is employed, the light source is placed at the focal point of the parabolic reflecting mirror so as to obtain parallel rays reflected from the parabolic mirror. The parallel rays are introduced through the transmissive display panel. When an oval reflecting mirror is employed, the light source is placed at a first focal point of the oval reflecting mirror, and the rays are focused on a second focal point, thereby allowing the rays to pass through the display panel as parallel rays. The transmissive display panel does not emit light rays but its transmissibility varies in accordance with a driving signal applied thereto. By modulating the intensity of light applied to the display panel, the pictures and characters are displayed.

For the transmissive display panels, display devices using a transmissive ceramic are known: for example, a liquid crystal panel, an electro-chromic display, a lead lanthanum zirconate titanate (PLZT). A liquid crystal panel is widely used in pocket-size television sets and word processors. Hereinafter, the liquid crystal display panel will be described as a typical example of the present invention.

In a liquid crystal display panel, commonly called a matrix type liquid crystal display panel, picture elements (openings) are arranged in a matrix in two directions perpendicular to each other and individually driven by driving voltages so as to change the optical characteristic of the liquid crystal. Thus, pictures and characters are displayed. A driving voltage can be applied to the individual picture elements by a simple matrix system or alternatively by an active matrix system under which a non-linear two-terminal element such as MIM (metal-insulating metal) or a three-terminal switching element such as TFT (thin film transistor) is disposed for each picture element.

Under the active matrix system the picture elements must be arranged with minimum pitches, which tend to reduce the ratio of an effective opening occupied by the picture elements to the total area, hereinafter referred to as the "aperture ratio". If all components of the display panel are reduced in size proportionally to the reduced pitches of picture elements, no change occurs in the aperture ration but owing to unavoidable irregularities in etching and alignment, the reduction in the sizes of metallic wiring to the electrodes, non-linear elements, TFT, etc. has a limit and they must be made to such a tolerance as to allow the irregular sizes. As the picture element pitches are minimized, the aperture ratio becomes low, and regeneration images become dark.

Japanese Laid-Open Patent Publications Nos. 60-262131, 61-11788, and 2-12224 disclose systems for increasing the aperture ratio, which are in common characterized by an arrangement in which an array of microlenses, such as fly eye lenses and lenticular lenses, are disposed on the light incident side or on the light incident and outlet sides of the display device in correspondence to each picture element. The light is focused in each picture element through the lens elements disposed on the light incident side.

Under these known systems the parallelism of rays is practically limited by the length of arc (i.e. the length of illuminating section) used as a light source, and the precision of the reflecting mirror, thereby making it difficult to focus light rays in the picture elements. In order to effectively focus light rays, an oval reflecting mirror is employed in the manner as shown in FIG. 3(a). As a light source an arc lamp 12 is disposed at a first focal point of the oval reflecting mirror 11 so as to enable the direction of the arc and the optical axis to be in accord with each other. If the arc lamp became a perfect point of illumination, the light rays therefrom would be focused at the second focal point of the oval reflecting mirror 11. In fact, however, they are not focused at the second focal point because the arc has a length and the reflecting mirror 11 inherently has an irregularity. The longer the arc becomes, the more the focusing spot diverges. The light rays passing through the second focal point become parallel by condenser lenses or any other optical means. However, the larger the focusing spot becomes, the less parallel the light rays become after passing through the condenser lenses.

When a parabolic reflecting mirror is employed, the arc lamp 12 is disposed at the focal point of the parabolic reflecting mirror 13 as shown in FIG. 3(b) so that the arc lamp 12 is disposed at the focal point of the parabolic reflecting mirror 13 so as to direct the arc in the same direction as that of the optical axis. In this case, when the arc of the arc lamp 12 becomes too long, the light rays tend to diverge with a relatively large angle $\alpha$, thereby resulting in the reduced parallelism of light rays from the source.

The parallel rays are focused on the picture elements by the microlenses disposed at the light incident side of the transmissive display panel. As shown in FIG. 4, a light having an angle of $\pm \theta$ is incident to the microlens 14 expands in a circle having a diameter of $(2f \times \tan \theta)$ on the display panel 15 disposed at a focal point (f) of the microlens 14. If the expansion exceeds beyond the picture element 15, the focusing spot fails to be within the picture element 15. In this way the advantages of the microlens are negated.

The known display system having an arc lamp disclosed such that the arc is generated in the same direction as that of the optical axis of the microlens has a disadvantage in that the electrodes of the arc lamp obstruct the passage of light, thereby producing an optical vacancy at the center of the illumination. This vacancy of illumination produces uneven brightness on the screen, thereby failing to reproduce uniformly bright image pictures and characters.

SUMMARY OF THE INVENTION

The projection type image display apparatus of this invention, which overcomes the above-discussed and numerous other disadvantages and deficiencies of the prior art, comprises an arc lamp for emitting light rays by arc discharge, a light reflecting means for reflecting the light from the arc lamp, a transmissive display panel comprising multiple picture elements arranged in a matrix wherein the picture elements are mutually arranged adjacent to their long sides and short sides, an optical means for irradiating the display panel with the light rays after they are made into parallel rays perpendicular to the display panel, a microlens array comprising lens elements arranged in correspondence to the respective picture elements, wherein the arc lamp is disposed perpendicularly to the optical axis of the optical means.

In a prefered embodiment, the microlens array is a lenticular lens which includes lens elements arranged along parallel rows of picture elements so as to focus the light rays in the respective picture elements, wherein the lens elements are arranged with the same pitch as that between the picture elements in the direction perpendicular to the parallel rows.

In a preferred embodiment, the arc in the projected image on the lenticular lens is aligned with a direction which corresponds to a larger value of c/a or b/d, wherein the b is a pitch between the picture elements adjacent to each other along the mutual long sides, d is the length of the long side, a is a pitch between the picture elements adjacent to each other along the mutual short sides.

In a preferred embodiment, the microlens array is a fly eye lens including multiple lens elements arranged with the same pitch as that between the picture elements so as to enable the parallel light rays to focus in the respective picture elements.

In a preferred embodiment, the arc of the arc lamp is directed so that the arc in the projected image on the fly eye lens is in parallel with the longer side of the respective picture elements.

In a preferred embodiment, the optical means is a condenser lens.

In a preferred embodiment, the arc lamp is disposed at the center of a spherical reflecting mirror.

In a preferred embodiment, the arc lamp is a metallic halides lamp.

In the pesent invention, it is arranged that the optical axis of the optical means is the Z axis, and axes crossing the Z axis at right angle are the X and the Y axis, respectively. Under this arrangement the direction of arc is in the X axis direction. The optical means is to make parallel light rays from the arc lamp, but the parallelism decreases disproportionately to an increase in the length of the arc along the X axis. The arc lamp is considered as a spot light source when it is viewed in the Y axis direction, thereby enabling the optical means to make exactly parallel light rays which are introduced into the microlens. The microlens array is disposed on the light incident side of the display panel, and the individual microlenses focus the parallel rays in the respective picture elements.

Thus, the invention described herein makes possible the objective of providing a projection type image display apparatus capable of reproducing uniformly picture images.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
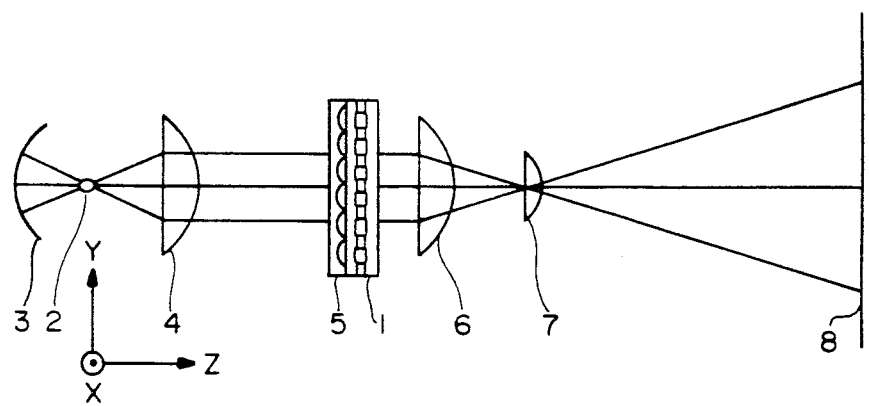
FIG. 1 is a diagrammatic view showing an optical system incorporated in a projection type image display apparatus according to the present invention.
Figure 5:
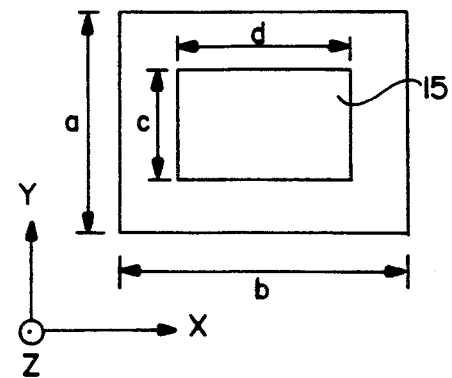
FIG. 5 is a diagrammatic view on an enlarged scale showing a picture element in the display panel.

As shown in FIG. 1, the projection type image display apparatus of this invention includes a liquid crystal display panel 1 (hereinafter referred to as merely "display panel"). The projection type image display apparatus will be referred to as "display apparatus". This display panel 1 is vertically held, and operates under the active matrix driving system. The display panel 1 is provided with picture elements 15 (openings individually of a rectangular shape as shown in FIG. 5, and with a lenticular lens 5 on its light incident side. Light rays from an arc lamp 2 (metallic halides lamp) are made parallel by a condenser lens 4, and the parallel rays are projected on the display panel 1 through the lenticular lens 5. In FIG. 1, the optical axis of the condenser lens 4 is indicated by Z, and the display panel 1 is placed in parallel with a plane X-Y perpendicular to the optical axis Z.

As shown in FIG. 5, the picture elements 15 of a rectangular shape are arranged with equal pitches in the directions of X and Y. Each picture element has a shorter side (Y axis) having a length of c and a longer side (X axis) having a length of d. In the illustrated embodiment, c is 88 μm and d is 104 μm; therefore, the area is represented by (88 μm×104 μm). The picture elements 15 are arranged with a longer pitch a and a shorter pitch b; in the illustrated embodiment, the longer pitch a is 190 μm and the shorter pitch b is 161 μm. Therefore, the aperture ratio is 30%. In the illustrated embodiment, the dimensional relationships among a, b, c and d are as follows:

$$c/a < b/d$$

The lenticular lens 5 includes a plurality of lens elements arranged with the same pitch as that in the Y direction between the picture elements 15 and in parallel therewith. The lenticular lens 5 focuses the parallel rays on the respective picture elements in the X direction through the lens elements.

Figure 2A:
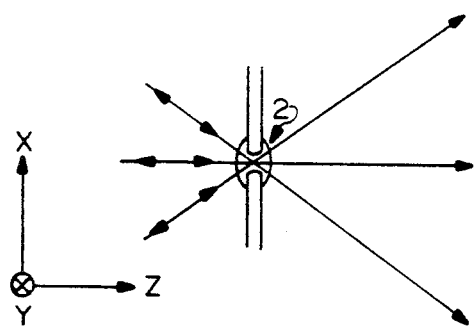
FIG. 2(a) is a diagrammatic view on an enlarged scale showing the light source shown in FIG. 1.
Figure 2B:
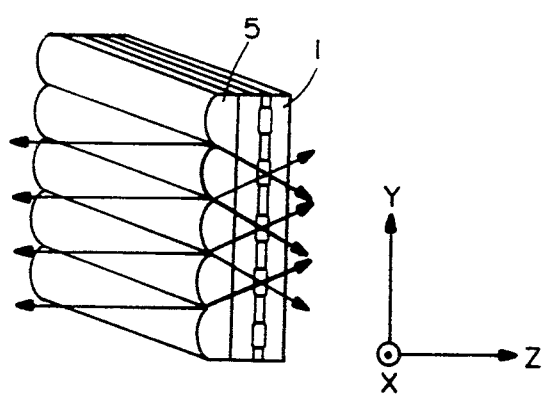
FIG. 2(b) is a diagrammatic view on an enlarged scale showing the display panel shown in FIG. 1.
Figure 3A:
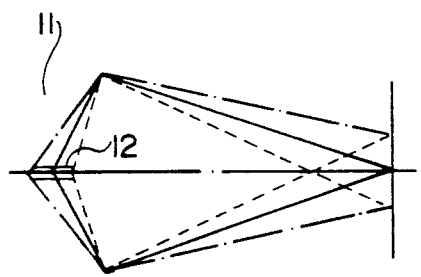
FIG. 3(a) is a diagrammatic view exemplifying the modes of light rays reflected from a reflecting mirror under a conventional display system.
Figure 3B:
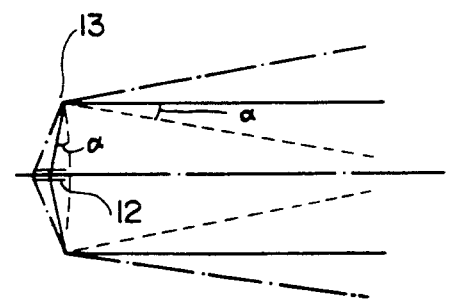
FIG. 3(b) is a diagrammatic view exemplifying the modes of light rays reflected from a reflecting mirror under another conventional display system.
Figure 4:
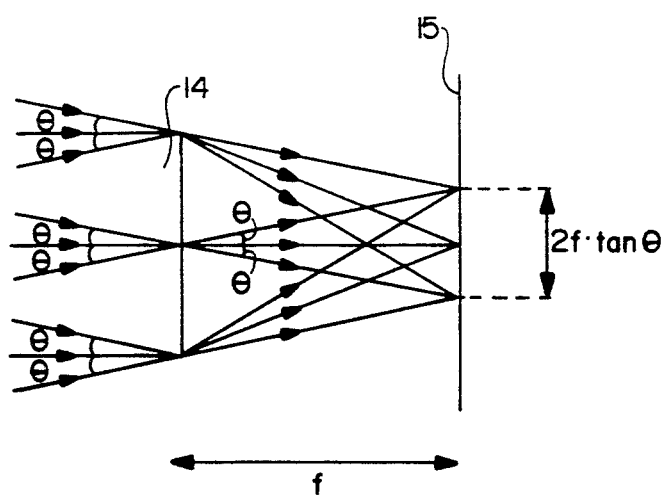
FIG. 4 is a diagrammatic view showing the relationship between the parallelism of the incident light rays to a microlens and the diameter of a focusing spot.

In the example the length of the arc of the metallic halides lamp 2 was 7 mm. The arc is directed in the X direction as shown in FIG. 2(a). The direction of the the arc in the projected image of the metallic halides lamp 2 is aligned with a direction which corresponds to a larger value of c/a or b/d. In the illustrated embodiment, the lens elements of the lenticular lens 5 are arranged in the X direction along the arc direction in the image of the metallic halides lamp 2 projected on the lenticular lens 5.

For the arc lamp, a metallic halides lamp, a halogen lamp, a Xenon lamp, or the like can be used.

The reference numeral 3 denotes a spherical reflecting mirror disposed at the opposite side to the display panel 1. The metallic halides lamp 2 is disposed at the center of the reflecting mirror 3 perpendicularly to the optical axis thereof. The light rays emitting from the metallic halides lamp 2 in the opposite direction to the display panel 1 are reflected from the spherical reflecting mirror 3 and return to the metallic halides lamp 2 from which they are projected to the display panel 1.

The light rays projected from the metallic halides lamp 2 toward the display panel 1 are made parallel by the condenser lens 4, and focused in the picture elements 15 in the display panel 1 through the lenticular lens 5. The parallel rays passing through the display panel 1 are focused through a field lens 6 are focused on a projection lens 7 disposed on the focal point position. Then the rays are projected onto a projection screen 8.

The condenser lens 4 and the field lens 6 are planoconvex lenses having a focal length of 200 mm and a diameter of 100 mm. As shown in FIG. 1, the condenser lens 4 is disposed with its flat surface facing the metallic halides lamp 2. The field lens 6 is disposed with its flat surface facing the display panel 1. The projection lens 7 is a plano-convex lens having a focal length of 200 mm and a diameter of 40 mm, and as shown in FIG. 1, disposed with its flat surface facing the display panel 1. The rays are focused on the flat surface by the field lens 6.

The light rays emitted from the metallic halides lamp 2 whose arc is directed in the X direction perpendicular to the optical axis (Z axis) diverge at an angle $\theta = \pm \tan^{-1} 3.5/200$ in the X direction, but become exactly parallel in the Y direction because the metallic halides lamp 2 is considered to be a spot light source. The parallel rays are introduced into the lenticular lens 5. Regardless of any length of the arc of the metallic halides lamp 2, the light rays remain parallel as a luminous band in the X direction of the display panel 1 (i.e. the longer sides of the picture elements 15) by the lenticular lens 5, and their intensity is modulated in accordance with the image pictures to be displayed. The light rays passing through the display panel 1 are focused on the projection lens 7 by the field lens 6, and projected onto the projection screen 8 by the projection lens 7.

In this way, the arc of the metallic halides lamp 2 extends in a direction perpendiucular to the optical axis, and in the same direction as that of the longer sides of the picture elements 15 in the display panel 1. As a result, the metallic halides lamp 2 is considered as a spot light source with respect to the optical axis and the direction perpendicular to the direction of the arc, thereby obtaining precisely parallel light rays. As compared with the conventional projection type display apparatus ignoring the direction of the arc of the arc lamp, the screen 8 become highly bright, and because of having no vacancy in the illumination which otherwise would occur owing to the shade of the electrodes, uniformity of brightness is maintained. Tests have discovered that when the lenticular lens 5 is employed, the brightness is almost twice that obtained when it is not employed.

In the illustrated embodiment a lenticular lens as a microlens is employed, but instead, a fly eye lens can be used. The fly eye lens includes multiple lens elements arranged with the same pitch as that between the picture elements in the display panel, so as to focus parallel light rays on the picture elements. The arc of the metallic halides lamp 2 is directed in the direction of the longer side (the X direction in the illustrated embodiment) of the picture elements 15.

The microlenses are fabricated by various methods; for example, by an ion exchange method, a swelling method, a heating method, and a mechanical method. In the ion exchange method, a substrate containing ion is kept kept into contact with another source of ions, and then voltage is supplied to the substrate. Refractive-index distribution occurs in the substrate so that the substrate has a lens function. In the swelling method, photosensitive monomer is polymerized by ultraviolet ray, and then an exposed portion is swollen into lenses by the osmotic pressure between the exposed portion and the non-exposed portion. In the heating method, after a photosensitive resin is patterned in circles, it is heated at a higher temperature than its melting point, and the resulting molten resin is formed into lenses under surface tension. In the mechanical method, a raw material is mechanically cut into lenses. The material usable for fabricating the microlenses can be clear resin such as acrylic resin, polycarbonate resin, polystyrene resin, glass or the like.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A projection type image display apparatus comprising an arc lamp for emitting light rays by arc discharge, a light reflecting means for reflecting the light from the arc lamp, a transmissive display panel comprising multiple rectangular picture elements arranged in a matrix wherein the picture elements are mutually arranged adjacent to their longer sides and shorter sides, an optical means for making the light rays parallel to each other, each light ray being perpendicular to the display panel and irradiating the display panel with the parallel rays, a microlens array comprising lens elements arranged in correspondence to the respective picture elements, wherein the arc lamp is disposed perpendicularly to the optical axis of the optical means.

2. A projection type image display apparatus according to claim 1, wherein the microlens array is a lenticular lens which includes lens elements arranged along, parallel rows of picture elements so as to focus the light rays in the respective picture elements, wherein the lens elements are arranged with the same pitch as that between the picture elements in the direction perpendicular to the parallel rows.

3. A projection type image display apparatus according to claim 2, wherein the arc in the projected image on the lenticular lens is aligned with a direction which corresponds to a larger value of c/a or b/d, wherein b is a pitch between the picture elements adjacent to each other along the mutual longer sides, d is the length of the longer side, c is the length of shorter sides, a is a pitch between the picture elements adjacent to each other along the mutual shorter sides.

4. A projection type image display apparatus according to claim 1, wherein the microlens array is a fly eye lens including multiple lens elements arranged with the same pitch as that between the picture elements so as to enable the parallel light rays to focus in the respective picture elements.

5. A projection type image display apparatus according to claim 4, wherein the arc of the arc lamp is directed so that the arc in the projected image on the fly eye lens is in parallel with the longer side of the respective picture elements along which the ratio of the electrode length to the pitch length is relatively large.

6. A projection type image display apparatus according to claim 1, wherein the optical means is a condenser lens.

7. A projection type image display apparatus according to claim 1, wherein the arc lamp is disposed at the center of a spherical reflecting mirror.

8. A projection type image display apparatus according to claim 1, wherein the arc lamp is metallic halides lamp.

* * * * *